United States Patent Office 3,234,172
Patented Feb. 8, 1966

3,234,172
POLYVINYL FLUORIDE/POLYFLUOROALCOHOL COMPOSITIONS
William D. Nicoll, Wilmington, Del., assignor to E. I. du Pont de Nemours and Company, Wilmington, Del., a corporation of Delaware
No Drawing. Filed Dec. 13, 1961, Ser. No. 159,161
15 Claims. (Cl. 260—33.4)

This invention relates to, and has as its principal object provision of, novel polymer compositions comprising, as the essential ingredients, vinyl fluoride polymers and certain polyfluorinated alcohols.

In many applications of high molecular weight polymers, such as film casting, surface coating, impregnating, use as adhesives, etc., solubility in organic solvents is a desirable property. Solubility at low or moderate temperature is especially desirable in the above-mentioned applications, and also to avoid or minimize the degradation of the polymer which often takes place when storage or use at elevated temperature is necessary to maintain the polymer in solution. In addition to fluid solutions, solid or semi-solid compositions wherein the polymer is homogeneously mixed with relatively small amounts of solvent serving as plasticizer, or where a minor amount of solvent is brought in contact with a solid polymer surface to impart surface effects or for sealing or bonding purposes, have great utility in polymer technology. Such uses also require solubility in the solvent, preferably at room temperature.

High molecular weight polymers consisting preponderantly of polymerized vinyl fluoride are known to be highly valuable technically, principally because of their thermal stability, dimensional stability, toughness and resistance to atmospheric conditions. These polymers are generally insoluble in the common solvents. They are soluble to some degree in a few very active solvents such as dimethylformamide, cyclohexanone, tetramethylsulfone, or γ-butyrolactone, but the temperatures required to effect solution are of the order of 150° C., and even dilute solutions tend to gel on cooling. No solvent has been known heretofore which is capable of retaining appreciable amounts of polyvinyl fluoride in solution at room temperature.

It has now been found that the fluoroalcohols of the type defined below are room temperature solvents for vinyl fluoride polymers.

The new products provided by this invention are compositions comprising, as their essential ingredients, a vinyl fluoride polymer containing in the polymer molecule at least 70% by weight of polymerized vinyl fluoride, and a polyfluoro gem-diol having one of the formulas (I) 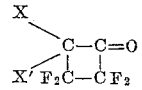

where R and R' are perfluoroalkyl, ω-chloroperfluoroalkyl or ω-hydroperfluoroalkyl radicals of 1 to 2 carbon atoms; and (II) 

where X and X' are fluorine or chlorine.

The gem-diols defined above may alternatively be referred to as hydrates of the polyfluoroketones of the formulas (III) 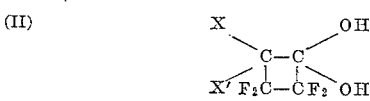

and (IV) 

where R and R', X and X', which may be alike or different, have the previously stated significance. For reasons of greater effectiveness as polymer solvents and of accessibility, the preferred polyfluoroketone hydrates (gem-diols) are those of Formula I in which R and R' are trifluoromethyl or chlorodifluoromethyl radicals.

The ketone hydrates defined by Formulas I and II are generally prepared from the corresponding ketones by treatment with water. Some of these ketones and hydrates have been reported in the literature and can be prepared by the described methods, e.g., those of U.S. Patent 2,807,646, 2,853,524 or 2,980,738. Others are obtainable by methods described in copending patent applications, as follows:

The acyclic polyfluoroketones can be prepared, as described in U.S. Patent 3,091,643, by the reaction, in a molar ratio of at least 2:1, of an ester of a polyfluoroalkanecarboxylic acid with an alkali metal alkoxide at temperatures below about 100° C., followed by acidification with a mineral acid. This reaction gives the ketones and/or their hydrates, i.e., the gem-diols.

The polyfluoroperhalocyclobutanones, i.e., the products of Formula II, can be prepared by the method described in U.S. Patent 3,129,248. This method comprises the hydrolysis with sulfuric acid of about 75–98% strength at a temperature of 125–300° C. of the 2,2-dihalo-1,3,3,4,4-pentafluorocyclobutyl hydrocarbyl ethers of the formula

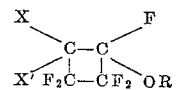

where X and X' are fluorine or chlorine and R is a hydrocarbon radical. These ethers are themselves prepared by cycloaddition at 125–250° C. of the requisite perhaloolefin $CF_2=C(X,X')$ and a perfluorovinyl hydrocarbyl ether $CF_2=CFOR$. The hydrolysis step yields the polyfluoroperhalocyclobutanones and/or their hydrates.

Specific polyfluoro gem-diols suitable for use in the compositions of this invention include the following:

Perfluoro(2,2-propanediol)

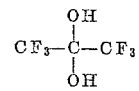

1,3-dichloro-1,1,3,3-tetrafluoro-2,2-propanediol

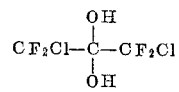

1-chloro-1,1,3,3,3-pentafluoro-2,2-propanediol

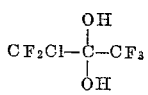

Perfluoro(3,3-pentanediol)

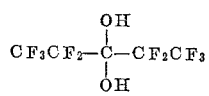

1,5-dichlorooctafluoro-3,3-pentanediol

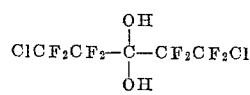

1H,3H-tetrafluoro-2,2-propanediol

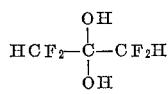

1H,5H-octafluoro-3,3-pentanediol

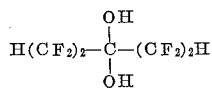

Perfluoro(1,1-cyclobutanediol)

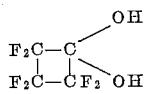

2-chloro-2,3,3,4,4-pentafluoro-1,1-cyclobutanediol

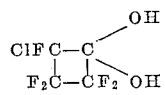

2,2-dichloro-3,3,4,4-tetrafluoro-1,1-cyclobutanediol

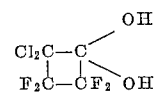

Most of the fluoroketone hydrates defined above are liquids at room temperature. A few are solids of relatively low melting points. Such solids, ohwever, are suitable for use in the compositions of this invention since, at or above their melting point, they dissolve vinyl fluoride polymers. The solutions may solidify on cooling to solid solutions, which can be reliquefied on warming when a fluid solution is needed. Furthermore, the normally solid fluoroketone hydrates are suitable for the preparation of solid, homogeneous blends with the polymer, to which they impart plasticizing or softening effects. Some fluoroketone hydrates are capable of forming more or less well defined higher hydrates containing from about 0.5 to about 1.5 moles of additional water, or even more in some cases. Such hydrates, which are usually liquid at room temperature or below, are suitable for the purposes of this invention.

The polymers with which this invention is concerned are the high molecular weight, essentially linear vinyl fluoride polymers containing at least 70% by weight of polymerized vinyl fluoride. These polymers include, in addition to polyvinyl fluoride itself, vinyl fluoride copolymers wherein at most 30% by weight of the polymer molecule is the polymerization product of one or more different polymerizable monomers. Among such monomers may be mentioned the ethylenically unsaturated hydrocarbons such as ethylene, propylene, isobutylene, styrene or 1,3-butadiene; the halogen-substituted hydrocarbons such as vinyl chloride, vinylidene chloride, vinylidene fluoride, chlorotrifluoroethylene, tetrafluoroethylene or 2-chloro-1,3-butadiene; the esters, nitriles and amides of acrylic and 1-alkylacrylic acids such as methyl acrylate, ethyl acrylate, methyl methacrylate, acrylonitrile, methacrylonitrile, acrylamide or methacrylamide; the vinyl carboxylates such as vinyl formate, vinyl acetate or vinyl benzoate; the vinyl ethers such as vinyl ethyl ether and vinyl dioxolane; the vinyl ketones such as methyl vinyl ketone; the N-vinyl imides such as N-vinyl succinimide or N-vinyl phthalimide; vinyl pyridine; and the like. The preferred copolymers are those in which vinyl fluoride is copolymerized with a terminally unsaturated monoethylenic monomer, and particularly a haloethylene wherein the halogen has atomic weight 9 to 17, i.e., is fluorine or chlorine.

In general, the vinyl fluoride polymers used in the compositions of this invention have a molecular weight such that their intrinsic viscosity is of the order of at least 0.3. For the most useful polymers this value is at least 0.35, and it is commonly between 1.0 and 4.5. The polymers used in the examples which follow were in that range of intrinsic viscosity.

The amount of vinyl fluoride polymer that can remain in solution at ordinary temperature in the defined fluoro gem-diols depends at least in part on the nature and molecular weight of the polymer. Solutions can be obtained that remain fluid at room temperature, though quite viscous, at concentrations of up to 2–3% by weight of polymers in the upper range of intrinsic viscosity, or at somewhat higher concentrations, up to about 5%, of polymers of lower intrinsic viscosity. These values are remarkably high, considering the notorious insolubility of vinyl fluoride polymers in organic solvents. Higher amounts of polymer dissolve in the fluoro gem-diols at temperatures of the order of 75–100° C. The essentially solid or semi-solid polymer compositions, wherein the fluoro gem-diol acts as a plasticizer, contain, of course, very much smaller amounts of it, for example as little as 0.5% of the fluoro gem-diol based on the weight of the polymer. This is also the case with compositions in which the fluoro gem-diol is used as a surface-treating agent, that is, a swelling or etching agent for polyvinyl fluoride surfaces, for example for heat-sealing or adhesive purposes. In such uses the outer surface of the polyvinyl fluoride article is attacked by the fluoro gem-diol to form a thin layer of dissolved or swollen polymer, i.e., a locally homogeneous composition, which constitutes an intimate bond between two polyvinyl fluoride surfaces, or one polyvinyl fluoride surface and another material.

Compositions, and especially fluid solutions, which comprise, in addition to the gem-diol solvent, minor amounts (for example up to 20% by weight of the total solvent) of an organic liquid miscible therewith are within the scope of this invention. The additional organic liquid can be a non-solvent for the polymer, such as benzene or the xylenes, or it can be one of the liquids known to have some solvent power, such as dimethylformamide or cyclohexanone. Water may also be present in minor amounts. The water, for example, may be that present in the already mentioned fluoroketone higher hydrates, such as the compound corresponding in composition to $(CF_3)_2C(OH)_2 \cdot \frac{1}{2}H_2O$. Even somewhat higher amounts of water, up to about 1.5 moles per mole of the fluoro gem-diol, can be tolerated.

The compositions can, of course, contain various other ingredients such as waxes, plasticizers, antioxidants, corrosion inhibitors, acid acceptors and other additives. For example, other polymeric materials soluble in the fluoro gem-diols may be present in addition to the vinyl fluoride polymer. The compositions, particularly the solutions, may also contain organic dyes or pigments, since the gem-diols readily form solutions or very fine dispersions of these organic colorants. These solutions can be used to form colored coatings on a variety of substrates such as metals, wood, ceramics or textile fibers, or to form self-supporting, pigmented films. They can also be used for painting or printing the surface of plastic articles made of polymers soluble in, or swellable by, the fluoro gem-diol vehicle, this treatment resulting in an intimate and adherent bonding of the solute (polyvinyl fluoride and colorant) to the plastic surface. Plastics which can be surface-dyed in this manner include polyvinyl fluoride itself, polyacrylonitrile, the polyacetal resins such as the formaldehyde polymers, the polyamides, the polyesters, etc.

Solutions of vinyl fluoride polymers in the fluoro gem-diols can be prepared at room temperature but this method usually requires prolonged contact time. It is generally more convenient to warm the polymer-solvent mixture at 90–100° C. until solution has taken place and then cool to room temperature, unless the solution is to be used hot. If any of the polymer separates on cooling, it can be removed by decantation. Solid solutions can also be prepared in this manner when the gem-diol is a solid at room temperature. Plasticized compositions can be prepared by intimate mixing of the components in any suitable mixing or milling apparatus. Other compositions include, for example, adhesive, sealing or primer coating compositions where a small amount of fluoro gem-diol, with or without a vinyl fluoride or other polymer dissolved therein, is applied to the surface of a polyvinyl fluoride article for the desired purpose.

Like many other fluorine-containing organic compounds, some of the fluoro gem-diols suitable for the purposes of this invention, for example 1,3-dichloro-1,1,3,3-tetrafluoro-2,2-propanediol, are toxic and should be handled with care.

The following examples illustrate specific embodiments of the invention. The polyvinyl fluoride solutions described in these examples were made by warming the polymer/solvent mixture to 95–100° C. for a brief period (less than five minutes is usually sufficient for laboratory quantities) and cooling the resulting clear solution to room temperature.

Example I

A solution was prepared containing approximately 1% by weight of a commercial, high molecular weight polyvinyl fluoride in perfluoro(2,2-propanediol) one-half hydrate, i.e., the product corresponding in composition to $(CF_3)_2C(OH)_2 \cdot \frac{1}{2}H_2O$. This solution was viscous but fluid at room temperature. A self-supporting, tough, coherent film of polyvinyl fluoride was obtained by spreading this solution on a glass plate and allowing the solvent to evaporate at room temperature.

A similar solution (approximately 1% concentration) was made using perfluoro(2,2-propanediol) without additional water. This is a solid melting at 45° C. On cooling to room temperature the solution remained fluid, presumably owing to the melting point lowering effect of the solute. A clear, flexible polyvinyl fluoride film was obtained by casting the solution on a glass plate and evaporating the solvent at room temperature.

Example II

A 1% solution of high molecular weight polyvinyl fluoride in perfluoro(2,2-propanediol) one-half hydrate was spread at room temperature on sheets of steel, copper and aluminum. Evaporation of the solvent produced thin, coherent protective coatings on these surfaces. Similar coatings were produced on mahogany and pine panels either by brushing or by spreading the viscous solution with a spatula. All these coatings were tough and repellent toward water and oil. The solution was also used to impregnate paper, which was thus made tougher and water-repellent.

Example III

A 1% solution of polyvinyl fluoride in 1,3-dichloro-1,1,3,3-tetrafluoro-2,2-propanediol was prepared. This solution, which was fluid at room temperature, formed a coherent, tough polymer film by evaporation of the solvent from a layer spread on a glass plate.

Example IV

Into a polyvinyl fluoride solution identical in composition with that of Example III was stirred 0.3% by weight of the nitroso dye Pigment Green 8 (Color Index No. 10,006), which dissolved readily. The solution thus obtained was brushed onto a molded piece of a commercial polyformaldehyde resin, a piece of commercial polyvinyl fluoride film, and a sheet of paper. All of the resulting colored coatings had an attractive appearance and showed good adhesion to the respective substrates.

A pigmented solution identical in composition to that described above was also used to paint wood and to impregnate cotton and wool fabrics. The fabrics were dipped in the solution, after which the solvent was allowed to evaporate. The dyed fabrics were only slightly stiffened.

Example V

In a heat sealing test, a small amount of 1,3-dichloro-1,1,3,3-tetrafluoro-2,2-propanediol was applied with a brush to the surface of two pieces of commercial polyvinyl fluoride film. The treated surfaces were then brought into contact and pressed together under a warm iron. A very strong seam was obtained, having a peel strength 3 to 4 times higher than that of a control seam made under the same conditions of heat and pressure but without solvent.

Similar results were obtained when using as the adhesive a 1% solution of polyvinyl fluoride in either $(CF_2Cl)_2C(OH)_2$ or $(CF_3)_2C(OH)_2 \cdot \frac{1}{2}H_2O$.

The excellent adhesion achieved in these tests results from the surface solubilizing effect of the fluoro gem-diol on the polymer, whereby an intimate bond forms by interpenetration of the two fluidified outer layers.

Example VI

A solution was prepared containing 1% by weight of commercial polyhexamethyleneadipamide in a solvent mixture consisting of 10 parts of 1,3-dichloro-1,1,3,3-tetrafluoro-2,2-propanediol and 3 parts of benzene by weight. Into this solution was stirred 0.1% by weight of a phthalocyanine pigment, Pigment Blue 15 (Color Index No. 74,160) which formed an extremely fine, stable dispersion. This composition was brushed onto a piece of commercial polyvinyl fluoride film. The resulting coating showed uniform color and good adhesion to the substrate.

Similar results are obtained when the same pigment dispersion, but without a dissolved polymer, is coated onto a polyvinyl fluoride film.

Example VII

A mixture of perfluoro(1,1-cyclobutanediol), a solid melting at 56° C., and 1% by weight of polyvinyl fluoride was warmed at 95–100° C. A clear, viscous solution resulted, which gelled on cooling to room temperature. The gel, or solid solution remelted easily on warming to 50–60° C. It was cast on a glass plate at that temperature and a coherent polymer film formed on evaporation of the solvent at 70° C.

Example VIII

A vinyl fluoride/tetrafluoroethylene copolymer containing 70% by weight of polymerized vinyl fluoride was dissolved at approximately 1% concentration in 1,3-dichloro-1,1,3,3-tetrafluoro-2,2-propanediol by warming to 100° C. The clear, viscous solution remained fluid at room temperature. Spreading the solution on a glass plate and allowing the solvent to evaporate resulted in the formation of a tough, coherent film of the copolymer.

The compositions of this invention have many and varied technical applications. The foregoing examples have illustrated some of their uses, including the preparation of self-supporting films, of clear and pigmented coatings on various substrates and the impregnation of paper and fabrics, and their use as heat-sealing adhesives. Fluid polymer solutions are further useful as cold application adhesives for various surfaces, especially of polymeric materials, as primer coatings, rods or tubes, in wire coating, etc. Solid plasticized compositions are suitable as molding powders for use in the fabrication of shaped objects, for example by injection molding or melt extrusion, or of films by hot-pressing.

Since obvious modifications and equivalents in the invention will be evident to those skilled in the chemical arts, I propose to be bound solely by the appended claims.

The embodiments of the invention in which an exclusive property or privilege is claimed are defined as follows:

1. A composition of matter comprising a major portion of two ingredients, these being (a) a vinyl fluoride polymer selected from the group consisting of homopolymers of vinyl fluoride and copolymers of at least 70% by weight of vinyl fluoride with another monoethylenically unsaturated monomer copolymerizable therewith and (b) at least 0.5% by weight, based on the weight of the polymer, of a polyfluoro gem-diol of the group consisting of (I) 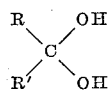

and (II) 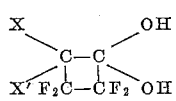

wherein R and R' are selected from the group consisting of perfluoroalkyl, ω-chloroperfluoroalkyl and ω-hydroperfluoroalkyl of 1–2 carbons and X and X' are selected from the group consisting of fluorine and chlorine.

2. The composition of claim 1 wherein the vinyl fluoride polymer is polyvinyl fluoride.

3. The composition of claim 1 wherein the vinyl fluoride polymer is a vinyl fluoride/tetrafluoroethylene copolymer.

4. The composition of claim 1 wherein the gem-diol is perfluoro(2,2-propanediol) one-half hydrate.

5. The composition of claim 1 wherein the gem-diol is perfluoro(2,2-propanediol).

6. The composition of claim 1 wherein the gem-diol is 1,3-dichloro-1,1,3,3-tetrafluoro-2,2-propanediol.

7. The composition of claim 1 wherein the gem-diol is perfluoro(1,1-cyclobutanediol).

8. A solution of polyvinyl fluoride in perfluoro(2,2-propanediol) one-half hydrate, the solution containing up to 5% by weight of the polymer.

9. A solution of polyvinyl fluoride in perfluoro(2,2-propanediol), the solution containing up to 5% by weight of the polymer.

10. A solution of polyvinyl fluoride in 1,3-dichloro-1,1,3,3-tetrafluoro-2,2-propanediol, the solution containing up to 5% by weight of the polymer.

11. A solution of polyvinyl fluoride in perfluoro(1,1-cyclobutanediol), the solution containing up to 5% by weight of the polymer.

12. A solution of a vinyl fluoride/tetrafluoroethylene copolymer in 1,3-dichloro-1,1,3,3-tetrafluoro-2,2-propanediol, said copolymer containing in the polymer molecule at least 70% by weight of polymerized vinyl fluoride, the solution containing up to 5% by weight of the polymer.

13. A vinyl fluoride polymer selected from the group consisting of homopolymers of vinyl fluoride and copolymers of at least 70% by weight of vinyl fluoride with another monoethylenically unsaturated monomer copolymerizable therewith plasticized by means of a polyfluoro gem-diol of the group consisting of (I) 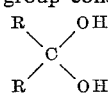

and (II) 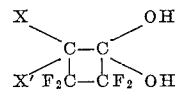

wherein R and R' are selected from the group consisting of perfluoroalkyl, ω-chloroperfluoroalkyl and ω-hydroperfluoroalkyl of 1–2 carbons and X and X' are selected from the group consisting of fluorine and chlorine.

14. Polyvinyl fluoride plasticized by means of 1,3-dichloro-1,1,3,3-tetrafluoro-2,2-propanediol.

15. Polyvinyl fluoride plasticized by means of perfluoro(1,1-cyclobutanediol).

References Cited by the Examiner
UNITED STATES PATENTS 2,862,977   12/1958   Schreyer _____ 260—33.4
3,039,995   6/1962   England _____ 260—32.8

MORRIS LIEBMAN, *Primary Examiner.*